(12) United States Patent
Kostin

(10) Patent No.: US 10,315,541 B2
(45) Date of Patent: Jun. 11, 2019

(54) DEFORMATION ELEMENT FOR A MOTOR VEHICLE SEAT

(71) Applicant: BROSE FAHRZEUGTEILE GMBH & CO. KOMMANDITGESELLSCHAFT, COBURG, Coburg (DE)

(72) Inventor: Sergej Kostin, Coburg (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 67 days.

(21) Appl. No.: 15/507,694

(22) PCT Filed: Aug. 19, 2015

(86) PCT No.: PCT/EP2015/068996
§ 371 (c)(1),
(2) Date: Feb. 28, 2017

(87) PCT Pub. No.: WO2016/034412
PCT Pub. Date: Mar. 10, 2016

(65) Prior Publication Data
US 2017/0259713 A1    Sep. 14, 2017

(30) Foreign Application Priority Data

Sep. 2, 2014    (DE) .................. 10 2014 217 506

(51) Int. Cl.
*B60N 2/427*    (2006.01)
*B60N 2/16*    (2006.01)
(Continued)

(52) U.S. Cl.
CPC ....... *B60N 2/42709* (2013.01); *B60N 2/0232* (2013.01); *B60N 2/16* (2013.01);
(Continued)

(58) Field of Classification Search
CPC .... B60N 2/42709; B60N 2/0232; B60N 2/16; B60N 2/161; B60N 2/165; B60N 2/4228; B60N 2/42727; B60N 2/42745
(Continued)

(56) References Cited

U.S. PATENT DOCUMENTS 6,053,571 A    4/2000   Faigle
6,296,306 B1   10/2001  Specht et al.
(Continued)

FOREIGN PATENT DOCUMENTS

DE    3940622 A1    6/1991
DE    19831218 A1   1/2000
(Continued)

*Primary Examiner* — Anthony D Barfield
(74) *Attorney, Agent, or Firm* — Lewis Roca Rothgerber Christie LLP

(57) ABSTRACT

A deformation element for a motor vehicle seat, which element is intended to be arranged on a subassembly of a motor vehicle seat, having a base member, a deformation portion which is formed on the base member and on which the deformation element can be deformed and/or destroyed under the action of an external force, and a force introduction region by means of which a structural element of a motor vehicle seat can be brought into operational connection with the deformation portion so that a force acting on that structural element can be introduced via the force introduction region into the deformation portion. The deformation portion is formed by means of partial deformation of the material of the deformation element and at the transition of the deformation portion to the base member of the deformation element there is a weakening region which defines at least one tear line.

18 Claims, 9 Drawing Sheets

(51) Int. Cl.
*B60N 2/42* (2006.01)
*B60N 2/02* (2006.01)

(52) U.S. Cl.
CPC .............. *B60N 2/161* (2013.01); *B60N 2/165* (2013.01); *B60N 2/4228* (2013.01); *B60N 2/42727* (2013.01); *B60N 2/42745* (2013.01); *B60N 2002/024* (2013.01)

(58) Field of Classification Search
USPC ....................................................... 297/216.1
See application file for complete search history.

(56) References Cited

U.S. PATENT DOCUMENTS

| | | | |
|---|---|---|---|
| 6,666,508 B1 * | 12/2003 | Hofmann | B60N 2/4214 297/216.1 |
| 8,210,606 B2 | 7/2012 | Meghira et al. | |
| 2003/0030315 A1 | 2/2003 | Shephard | |
| 2005/0140190 A1 | 6/2005 | Kawashima | |
| 2008/0100104 A1 | 5/2008 | Axelsson et al. | |
| 2009/0001786 A1 | 1/2009 | Haglund | |
| 2010/0013279 A1 | 1/2010 | Cailleteau | |
| 2010/0176621 A1 | 7/2010 | Aufrere et al. | |
| 2010/0194157 A1 | 8/2010 | Nitsuma et al. | |
| 2013/0113247 A1 | 5/2013 | Magnus et al. | |
| 2013/0200666 A1 | 8/2013 | Huttemann et al. | |
| 2013/0278031 A1 | 10/2013 | Kostin et al. | |
| 2014/0339865 A1 | 11/2014 | Schwarze et al. | |
| 2015/0042133 A1 | 2/2015 | Munemura et al. | |

FOREIGN PATENT DOCUMENTS

| | | |
|---|---|---|
| DE | 19928813 C1 | 12/2000 |
| DE | 10107694 C1 | 6/2002 |
| DE | 102006003651 A1 | 8/2007 |
| DE | 102007039862 A1 | 2/2009 |
| DE | 102009002825 A1 | 11/2010 |
| DE | 102010029129 A1 | 11/2011 |
| DE | 102010063972 A1 | 6/2012 |
| DE | 102011055860 A1 | 6/2013 |
| EP | 0709249 A2 | 5/1996 |
| EP | 0963872 B1 | 8/2007 |
| EP | 2123506 B1 | 11/2010 |
| EP | 2674322 A1 | 12/2013 |
| JP | 51-85419 | 7/1976 |
| JP | H10278644 A | 10/1998 |
| JP | 2008222021 A | 9/2008 |
| JP | 2010162981 A | 7/2010 |
| WO | WO97/29923 | 8/1997 |
| WO | WO2006/003167 A1 | 1/2006 |
| WO | WO2008/017794 A2 | 2/2008 |
| WO | WO2008/149044 | 12/2008 |

* cited by examiner

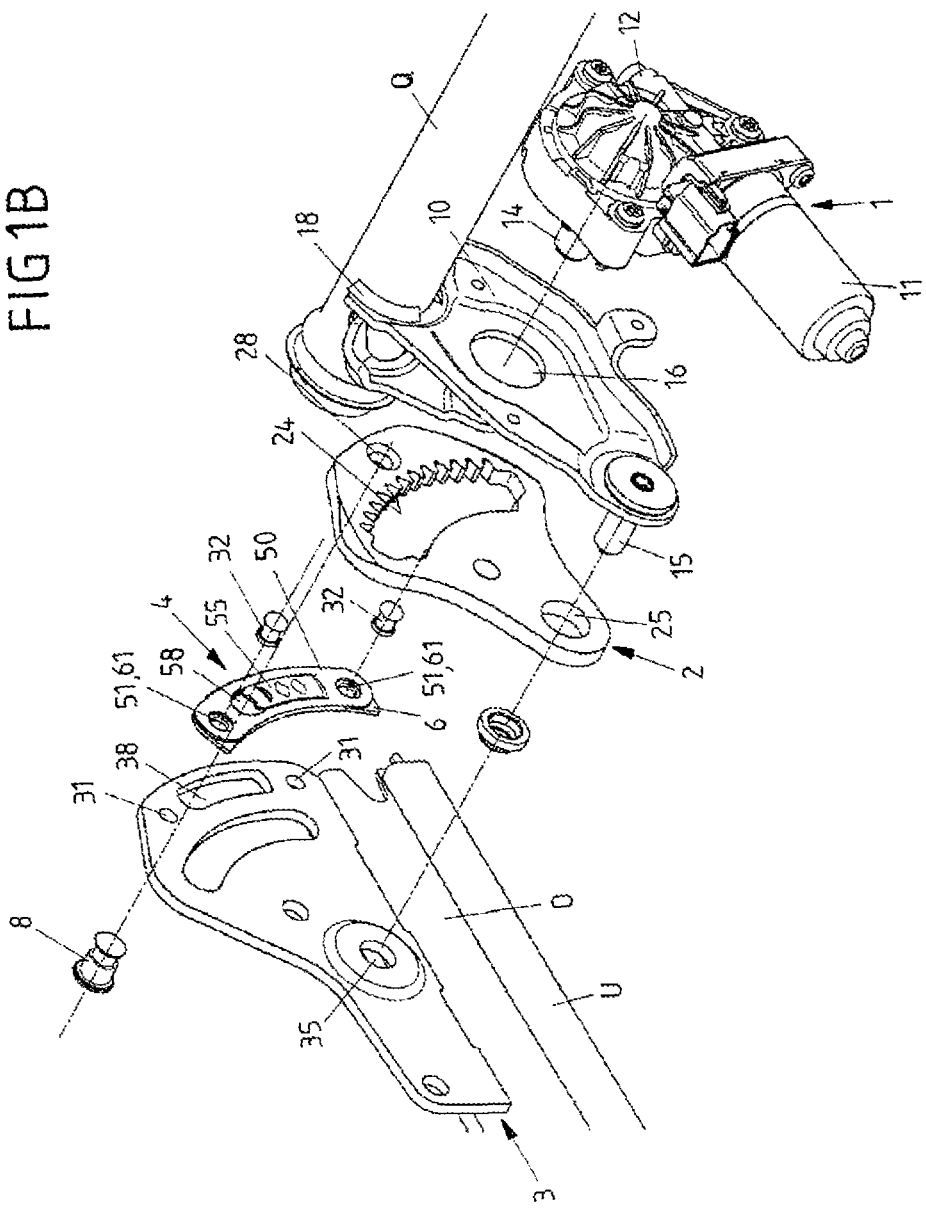

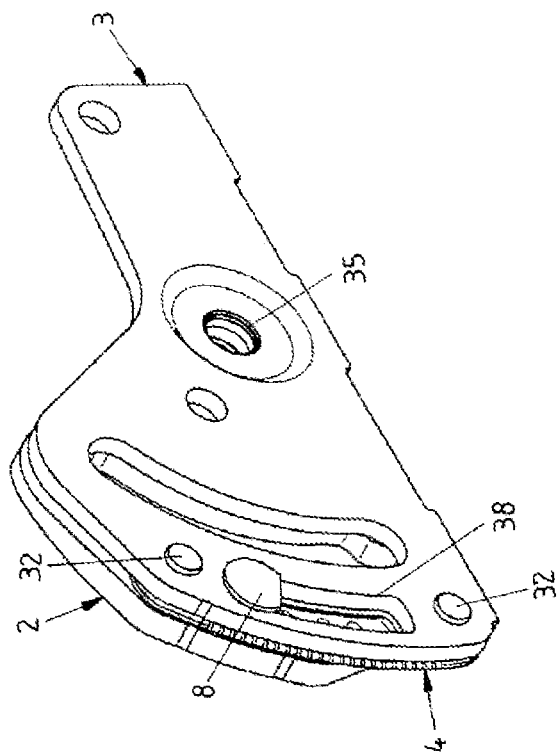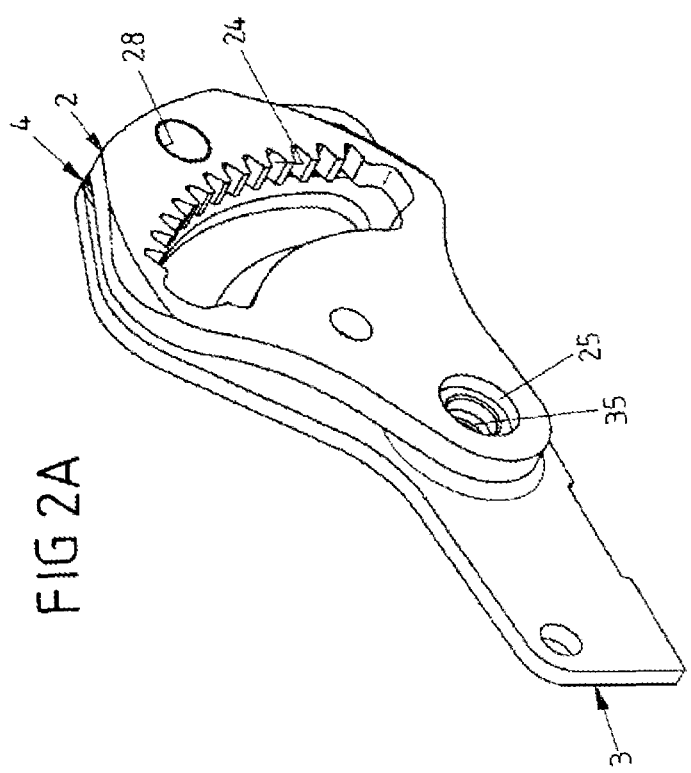

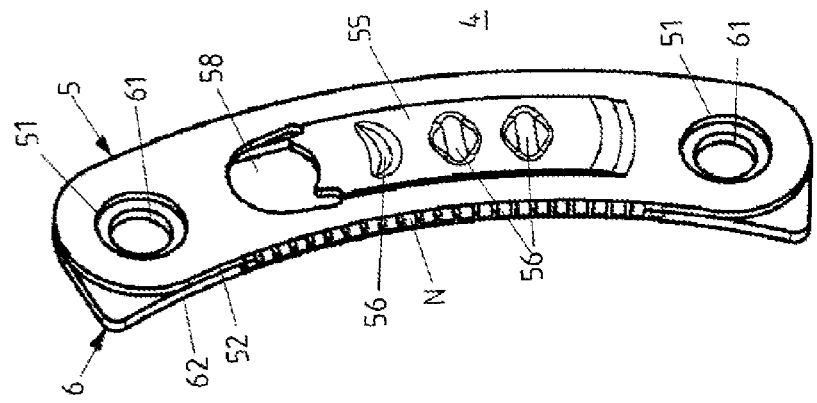
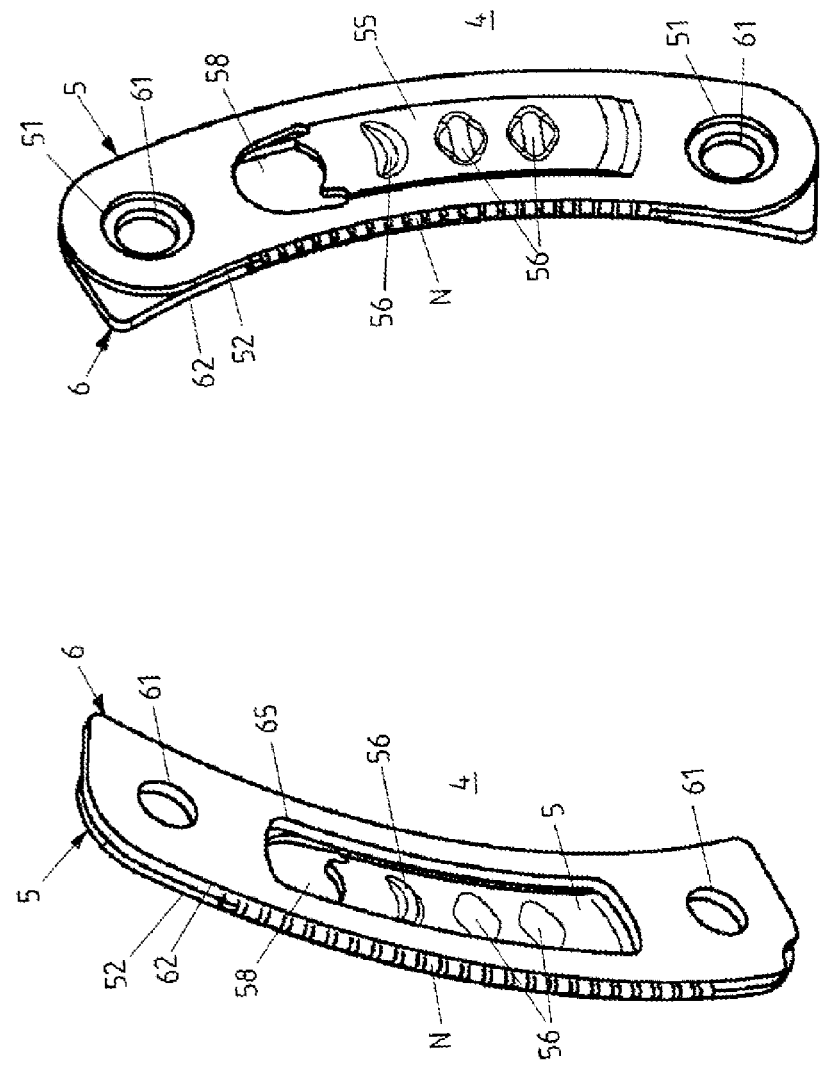

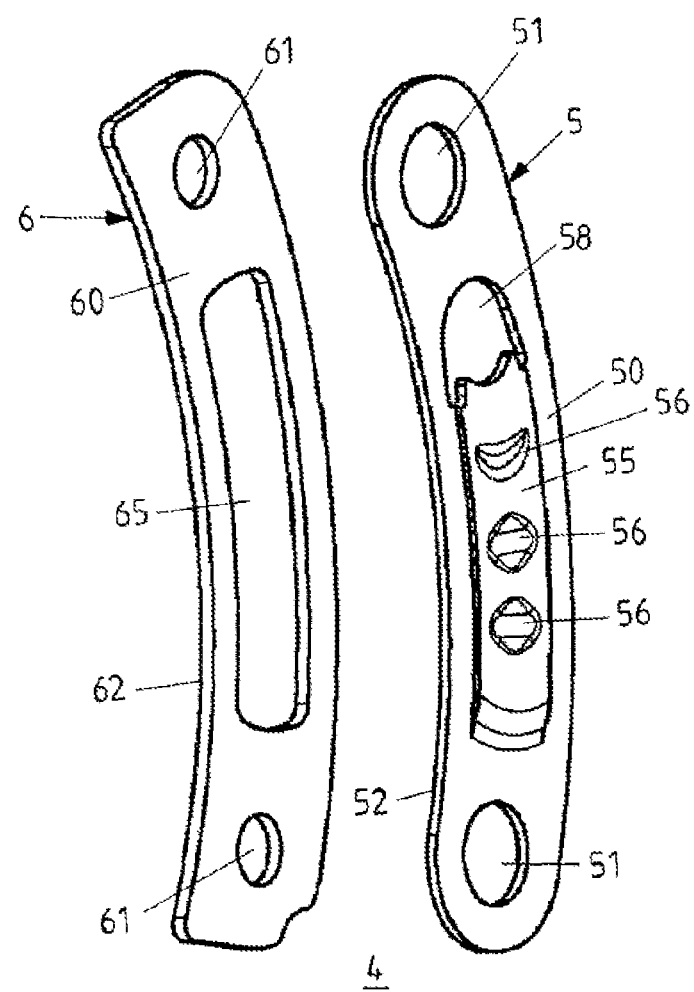

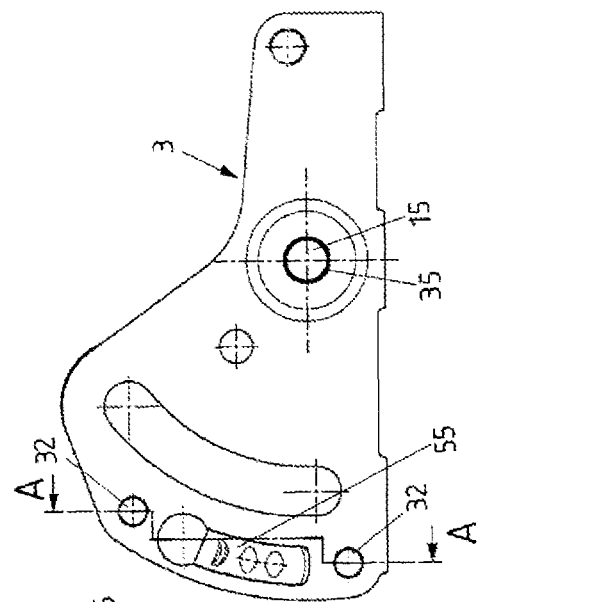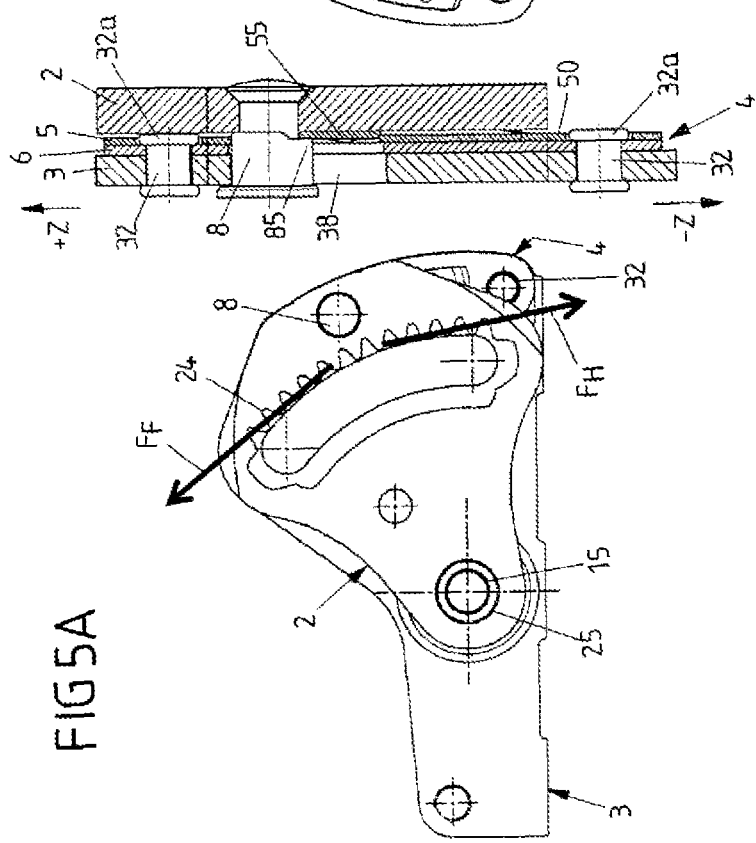

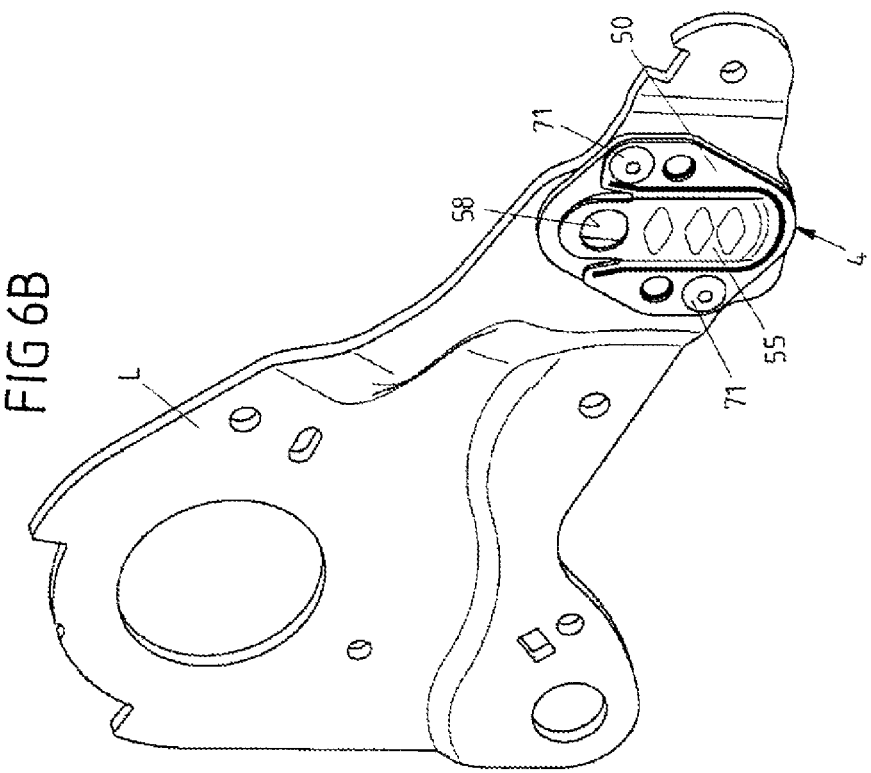
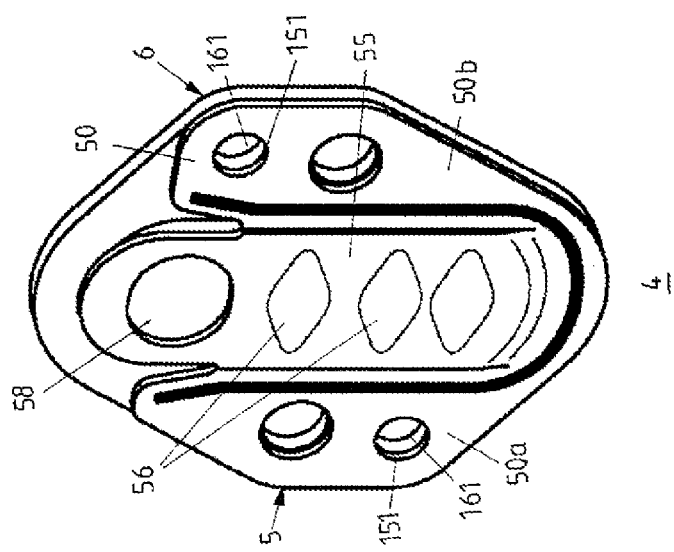

DEFORMATION ELEMENT FOR A MOTOR VEHICLE SEAT

CROSS-REFERENCE TO A RELATED APPLICATION(S)

This application is a National Phase Patent Application of International Patent Application No. PCT/EP2015/068996, filed on Aug. 19, 2015, which claims priority of German Patent Application Number 10 2014 217 506.2, filed on Sep. 2, 2014. The entire contents of which are hereby incorporated by reference.

BACKGROUND

The invention relates to a deformation element for a motor vehicle seat, which element, when used in accordance with provisions, is intended to be secured to a subassembly of the motor vehicle seat.

Such a deformation element comprises a base member and a deformation portion which is constructed on the base member and on which the deformation element can be deformed and/or destroyed under the action of an external force, and furthermore a force introduction region by means of which a structural element of a motor vehicle seat can be brought into operational connection with the deformation portion so that forces acting on the mentioned structural element (as a result of an accident) can be directed into the deformation portion of the deformation element.

Using such a deformation element, on the one hand, in the event of a crash, kinetic energy can be dissipated or more specifically converted into energy forms which are produced during the deformation and/or destruction of the deformation portion of the deformation element, in particular heat and deformation energy. Furthermore, as a result of deformation or destruction of the deformation portion, it is possible to bring about in a selective manner a limited movement of a first seat subassembly, for example, a backrest, with respect to a second seat subassembly, for example, the lower seat frame. As a result of the conversion of kinetic energy into other energy forms and a selectively controlled movability, for example, of the backrest with respect to the lower seat frame in the event of a crash, the risk of injury to an occupant of a vehicle sitting on the corresponding motor vehicle seat can be considerably reduced. This applies in particular to the risk of injuries in the throat and neck region in the event of rear-end accidents ("rear-end crash") or in the event of leaving the road ("run-off-road crash").

EP 2 674 322 A1 describes a motor vehicle seat having a deformation element which can be used for the above-mentioned purposes. In this instance, the deformation region is integrally formed on the base member of the deformation element and has a smaller thickness with respect thereto.

SUMMARY

A problem addressed by the invention is to provide a deformation element of the type mentioned in the introduction which, whilst being simple to produce, is distinguished in that kinetic energy can be reliably dissipated therewith in the event of a crash and in a selective manner a defined movability of two seat subassemblies with respect to each other can be enabled.

This problem is solved according to the invention with the provision of a deformation element having features as described herein.

Accordingly, the deformation portion of the deformation element is formed by means of partial deformation of the material of the deformation element in such a manner that, at the transition of the deformation element to the base member of the deformation element, there is a weakening region which defines at least one tear line along which the deformation element preferably tears open under the action of an external force. The deformation may be carried out in particular under the action of pressure, for example, by means of shearing (punching).

The solution according to the invention simply enables the formation of a deformation portion on a deformation element by acting on the base member of the deformation element with a suitable tool, such as, for example, a punch. It is thus possible to produce, for example, from a metal component, where applicable a sheet metal component, in a cost-effective manner a reliably functioning deformation element, in particular in the form of a simple punched component. The deformation element can additionally be configured in a space-saving manner and can thereby be integrated in small spaces. Furthermore, lightweight construction requirements can thereby be complied with.

For example, (hot or cold rolled) strip steels are suitable as the material for the deformation element. As a result of the different mechanical properties of steels of different quality, by selecting a specific steel as the material for the deformation element the level of the crash energy which can dissipated therewith can be influenced.

The formation of the deformation portion by means of partial deformation of the deformation element can be carried out in such a manner that, as a result of the deformation process, for example, a punching process, the deformation portion is connected to the base member of the deformation element at least partially (for example, outside the force introduction region) by means of a connection region whose thickness is smaller than the thickness of the deformation portion outside that connection region (in which the deformation portion merges into the base member of the deformation element). The connection region consequently forms the weakening region along which the deformation element preferably tears in the event of the action of an external force. The thickness of the deformation portion or the connection region is in this instance intended to be understood to be the extent transverse relative to the face along which the deformation element extends. The connection region may in particular be formed by means of a shearing edge. Furthermore, the deformation portion, transversely relative to the face along which the deformation element extends, may protrude beyond the base member thereof.

The base member of the deformation element, on the one hand, and the deformation portion thereof, on the other hand, may in this instance have substantially the same thickness.

According to another aspect of the invention, the base member of the deformation element is secured in a materially engaging manner, in particular by means of welding or laser welding, to a carrier component, together with which the deformation element is secured to a motor vehicle seat. The base member of the deformation element can thereby be reinforced in a selective manner in order to ensure that, when crash forces are introduced into the deformation element, the element is deformed in a selective manner in the deformation portion and not outside the deformation portion.

The materially engaging connection of the base member of the deformation element to the carrier component may in particular be carried out in such a manner that the base member, on the one hand, and the carrier component, on the other hand, are connected to each other in a materially engaging manner along the respective (peripheral) outer edge thereof. When the materially engaging connection is produced by means of welding or laser welding, this means that the weld seam extends at least partially along both the outer edge of the base member and the carrier component and thus the outer edge of the base member, on the one hand, and the outer edge of the carrier component, on the other hand, are directly connected to each other by means of that seam.

The carrier component is preferably constructed in such a manner that, on the one hand, it covers the base member of the deformation element and, on the other hand, it has a through-opening which extends along the deformation portion of the deformation element. That is to say, the carrier component reinforces the base member of the deformation element in a selective manner, but without impairing the function of the deformation portion.

So that crash forces acting on the structural element which is coupled to the deformation element can be selectively introduced into the deformation portion, the force transmission region by means of which that structural element cooperates with the deformation element is advantageously arranged directly adjacent to the deformation portion.

The force transmission region may, for example, be constructed as an opening, in which a seat element can engage, for example, by means of a pin.

A deformation element according to the invention may, for example, be integrated in a seat adjustment device, such as a seat height adjustment unit, or also be integrated in any other manner in a connection of two seat subassemblies which are intended to be able to be moved in a limited manner with respect to each other in the event of a crash.

A subassembly of a motor vehicle seat having a deformation element according to the invention is in addition described herein.

BRIEF DESCRIPTION OF THE DRAWINGS

Other details and advantages of the invention will be appreciated from the following description of an embodiment with reference to the Figures.

FIG. 1B is an exploded view of the seat adjustment device from FIG. 1A.

FIG. 2A is a first perspective view of a subassembly of the seat adjustment device from FIGS. 1A and 1B with an integrated deformation element.

FIG. 2B is a second perspective view of the subassembly from FIG. 2A.

FIG. 3A is a first perspective view of the deformation element from FIGS. 2A to 2C.

FIG. 3B is a second perspective view of the deformation element from FIGS. 2A to 2C.

FIG. 3C is an exploded illustration of the deformation element from FIGS. 2A and 2B.

FIG. 5A is a view of the subassembly from FIGS. 2A to 2C with arrows which indicate possible directions of the forces which occur in the event of a crash.

FIG. 5B is a rear view of the subassembly from FIG. 5A.

FIG. 5C is a cross-section through FIG. 5B.

FIG. 6A is another embodiment of a deformation element.

FIG. 6B shows the deformation element from FIG. 6A on a backrest component of a motor vehicle.

DETAILED DESCRIPTION

Figure 1A:
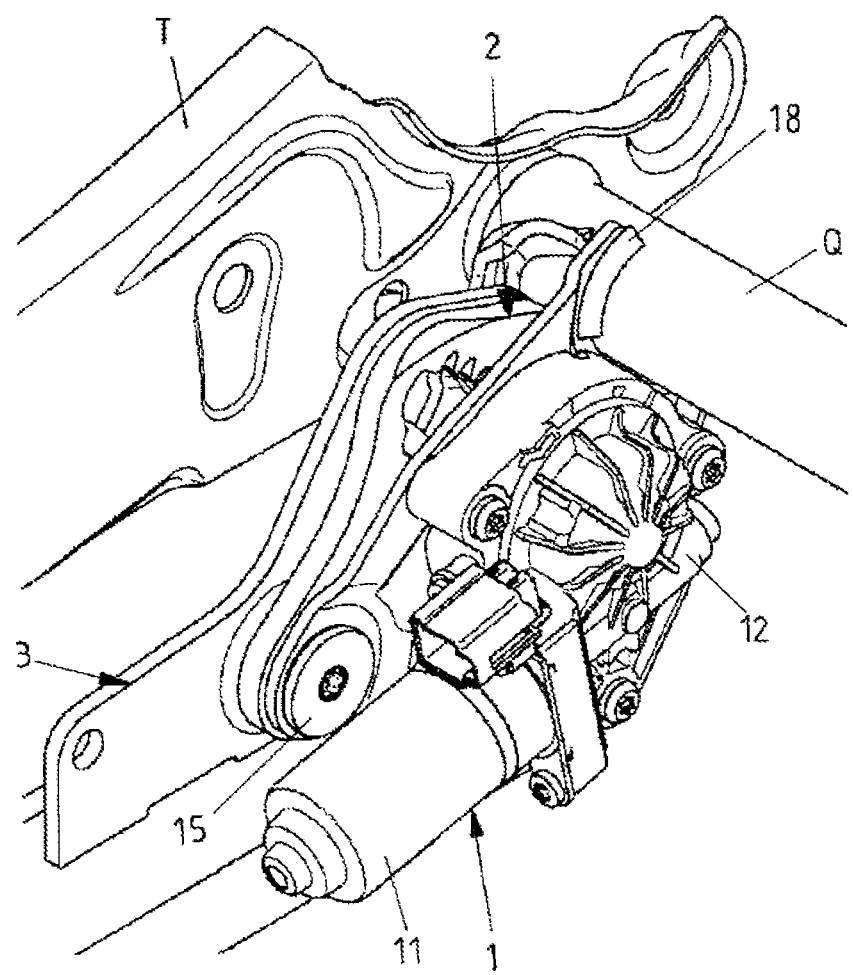
FIG. 1A is a perspective illustration of a seat adjustment device for a motor vehicle seat.

FIGS. 1A and 1B illustrate on the one hand in a perspective manner and on the other hand as an exploded view a seat adjustment device for a motor vehicle seat by means of which a transverse pipe Q of a motor vehicle seat—and consequently also the seat subassemblies which are connected to the transverse pipe Q, such as, for example, a seat or upholstery carrier T—can be adjusted with respect to the vehicle base or a longitudinal rail guide O, U which is arranged thereon. The longitudinal rail guide O, U comprises a base-side guide rail (lower rail U) which is secured to the base of a motor vehicle and an upper rail O which is guided thereon in a longitudinally movable manner. The position of a vehicle seat in the extent direction of the longitudinal rail guide O, U can thereby be adjusted.

The seat adjustment device which is illustrated in FIGS. 1A and 1B and by means of which the position of the transverse pipe Q can be adjusted with respect to the longitudinal rail guide O, U is constructed as a height adjustment unit. That is to say, it is thereby possible to adjust in particular the spacing of the transverse pipe Q from the longitudinal rail guide O, U transversely relative to the vehicle base.

Figure 2C:
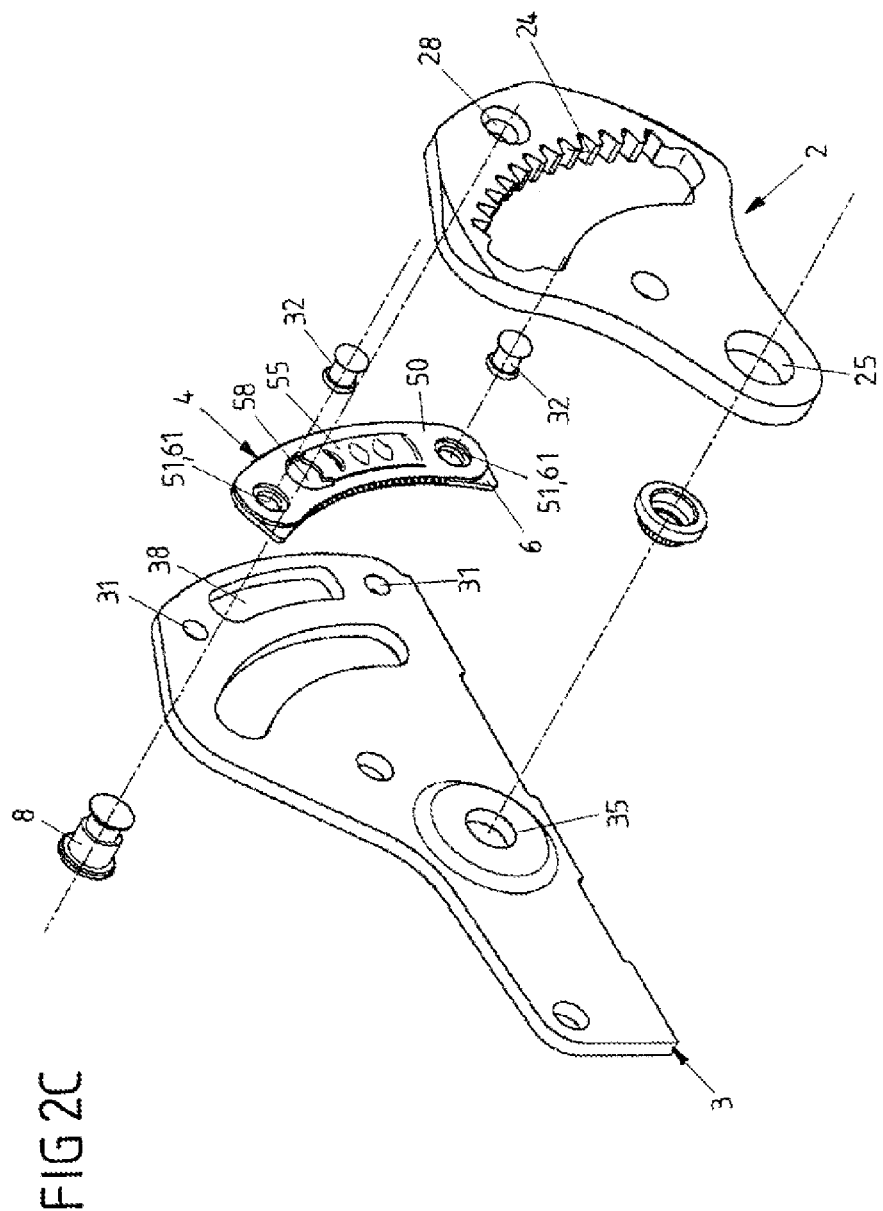
FIG. 2C is an exploded illustration of the subassembly from FIGS. 2A and 2B.

A subassembly of the seat adjustment device from FIGS. 1A and 1B is further shown in FIGS. 2A to 2C, on the one hand, as two perspective views and, on the other hand, as an exploded view. Reference will additionally be made to this below with respect to FIGS. 1A and 1B.

The seat adjustment device from FIGS. 1A and 1B comprises a drive subassembly 1 having a drive motor 11 and an adjustment gear 12 which is driven thereby and which has at the output side an adjustment component 14 in the form of a toothed wheel (pinion). The drive motor 11 and the adjustment gear 12 are arranged on a drive carrier 10 of the drive subassembly 1.

The drive carrier 10 and consequently the drive subassembly 1 on the whole (by means of a bearing element 15, in this instance in the form of a bearing pin) is pivotably supported on the longitudinal rail guide O, U, or more specifically on a structural element which is in the form of bearing component 3 and which is arranged on the upper rail O of the longitudinal rail guide O, U. The bearing component 3 has to this end a bearing location 35, in the embodiment in the form of a bearing opening with which the drive-subassembly-side bearing element 15 can be brought into engagement in order to pivotably support the drive subassembly 1.

On the other hand, the drive subassembly 1 is connected to the transverse pipe Q by means of a retention region 18 of the drive carrier 10. During a pivot movement of the drive subassembly 1 with respect to the longitudinal rail guide O, U or the bearing component 3 which is arranged thereon, the position of the transverse pipe Q relative to the longitudinal rail guide O, U is thereby adjusted. In order to produce such a pivot movement, the output-side adjustment component 14 of the drive subassembly 1, which component is constructed in the embodiment as a toothed wheel, is in toothed engagement with a longitudinal tooth arrangement 24 which is formed on a structural element in the form of a toothed component 2. (To this end, the adjustment component 14 engages through an opening 16 in the drive carrier 10.)

If the toothed component 2 is securely connected to the bearing component 3 (and thereby to the upper rail O of the longitudinal rail guide O, U), the pivot movement of the drive subassembly 1 required for the above-described adjustment operation is initiated in that, during operation of the drive motor 11, the output-side drive element 14 of the drive subassembly 1 cooperates with the longitudinal tooth arrangement 24 of the toothed component 2. Such an adjustment device is described in detail in DE 10 2010 063 972 A1, to which reference may be made here for further details.

This case involves in particular the integration of a deformation element 4 in such an adjustment device which will be further described below with reference to FIGS. 1A to 2C with additional reference to FIGS. 3A to 3C and 4A and 4B.

As can be seen with reference to FIGS. 1B and 2C, the toothed component 2 is connected to the bearing component 3 at two connection locations so that a rotationally secure connection exists. The connection is carried out, on the one hand, by the toothed component 2 being supported by means of a bearing location 25 on the pivot bearing which is defined by means of the drive-subassembly-side bearing element 15 and the bearing-component-side bearing location 35. Specifically, the toothed component 2 is received by means of a bearing location 25 in the form of a bearing opening between the drive-subassembly-side bearing element 15 and the bearing-component-side bearing location 35. This connection itself would enable a pivot movement of the toothed component 2 with respect to the bearing component 3.

The toothed component 2 is, however, arranged in a rotationally secure manner on the bearing component 3 by the toothed component 2 additionally being connected to the bearing component 3 by means of a securing location 28 which is spaced apart from the bearing location 25. This additional connection is carried out by means of a securing element 8, for example, in the form of a rivet, which engages through the bearing component 3 and which engages in the securing location 28 of the toothed component 2 in the form of a securing opening. The securing element 8 is in this instance received on the bearing component 3 by means of a deformation element 4.

The deformation element 4 is shown in FIGS. 2A to 2C as a component of the subassembly which comprises the toothed component 2, the bearing component 3 and the deformation element 4 and furthermore in FIGS. 3A to 3C as an individual component. In addition, in FIGS. 4A and 4B, a component of the deformation element 4 is illustrated in greater detail.

The deformation element 4 comprises in the embodiment two components, of which one component is constructed as a deformation component 5 and the other component is constructed as a carrier component 6.

The deformation component 5 defines a base member 50 of the deformation element 4 which extends in a planar manner and which is surrounded by a peripheral outer edge 52. The base member 50 of the deformation element 4 or more specifically of the deformation component 5 is further provided with securing locations 51 in the form of securing openings by means of which the deformation component 5 can be secured to the bearing component 3 or securing locations 31 which are provided at that location, in the embodiment also in the form of securing openings. To this end, securing elements 32 illustrated in FIG. 1B in the form of rivets can be used.

However, the deformation component 5 is in this instance not secured to the bearing component 3 as an individual component but instead as a component of a structural unit which in addition to the deformation component 5 comprises the carrier component 6 and which forms the deformation element 4. The carrier component 6 has a base member 60 which extends in a planar manner and which is limited by a peripheral outer edge 62 and which is provided with securing locations 61, in this instance in the form of securing openings.

The base member 50 and the deformation portion 55 of the deformation element 4 may in particular comprise metal. The same applies to the carrier component 6.

In the case of an assembly according to provisions of the components shown in FIG. 3C (deformation component 5 and carrier component 6) of the securing element 4, as illustrated in FIGS. 3A and 3B, the securing locations 51, 61 at both sides in the form of securing openings are aligned in such a manner that the structural unit comprising the deformation component 5 and the carrier component 6 in the form of the deformation element 4 can be secured to the bearing component 3 through the securing openings 51, 61 at both sides, as can be seen with reference to FIG. 1B.

Furthermore, with reference to FIGS. 3A and 3B it is clear that the deformation component 5 and the carrier component 6 of the deformation element 4 with the peripheral edges 52, 62 thereof together define a peripheral edge of the deformation element 4. That is to say, if the deformation component 5 and the carrier component 6 are placed one on the other in accordance with provisions, as shown in FIGS. 3A and 3B, the peripheral outer edges 52, 62 thereof are directly adjacent to each other.

In this instance, the deformation component 5 and the carrier component 6 according to FIG. 3C are connected along their peripheral edges 52, 62 or more specifically at their peripheral edges 52, 62 in a materially engaging manner, that is to say, in the embodiment by means of laser welding with a laser weld seam N being formed, and are thereby combined to form a structural unit in the form of the deformation element 4.

Figure 4A:
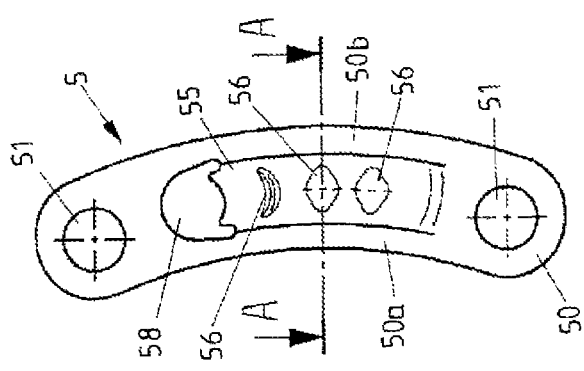
FIG. 4A is a plan view of the deformation element from FIGS. 3A to 3C.
Figure 4B:
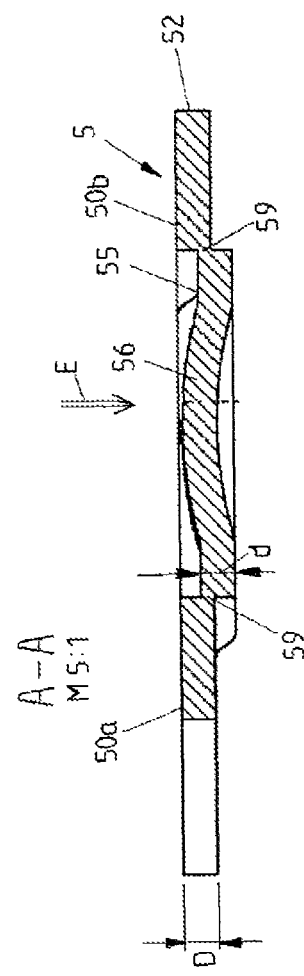
FIG. 4B is a cross-section through the illustration of FIG. 4A.

The deformation component 5 comprises in addition to the base member 50 a deformation portion 55 which is formed integrally thereon. As can be seen in particular with reference to FIGS. 3C, 4A and 4B, this deformation portion is produced by means of a partial deformation of the deformation component 5. More specifically, the deformation portion 55 is formed by acting on the deformation component 5 with pressure, for example, by means of a stamp, by means of a shearing action or punching. In FIGS. 3C, 4A and 4B, those regions at which the deformation component 5 has been selectively deformed or changed in terms of shape in order to form the deformation portion 55 are shown in each case as deformation regions 56 (in the form of beads) of which two are lozenge-shaped and one is sickle-shaped in the embodiment. As a result of the geometry of the deformation regions 56, the fold path of the deformation portion 55 can be controlled in the event of a crash. At the deformation regions 56 which define the deformation portion 55, the portion protrudes in each case with respect to the base member 50 thereof transversely relative to the face along which the deformation component 5 extends. That is to say, by acting on the deformation component 5 by means of a stamp in a direction E transversely relative to the face along which the deformation component 5 extends, the material of the deformation component 5 is partially deformed in such a manner that it protrudes in the said direction E beyond the base member 50.

The connection regions 59 by means of which the deformation portion 55 (which is formed by means of the action of a stamp or by means of punching) is connected to the base member 50 of the deformation component 5 thereby have a smaller thickness (extent transverse relative to the face along which the deformation component 5 extends) than the base member 50 and the deformation portion 55. The last elements have in the embodiment an identical thickness D=d. In this instance, the connection regions 59 are constructed here as shearing edges which, during the formation of the deformation portion 55, are produced by the action of a stamp, that is to say, in particular by means of punching or shearing.

At those connection regions 59, the deformation portion 55 of the deformation element 4 is primarily deformed or destroyed when an external force is introduced therein. In this instance, these may in particular be forces which, in the event of a crash act on the vehicle seat and which are introduced via the securing element 8. That is to say, the connection regions 59 define a weakening region (in the form of at least one tear line) along which the deformation element 4 is primarily torn open under the action of an external force.

In order to introduce a force which acts on the adjustment device into the deformation element 4, more specifically in the deformation portion 55 thereof, there is used a force introduction region 58 which is constructed in the embodiment as an opening in the deformation element 4 or in the deformation component 5. The toothed component 2 engages in the force introduction region 58 in the form of an opening with the securing element 8 which is used to secure the toothed component 2 to the bearing component 3. The securing is carried out in this instance in such a manner that the securing element 8, on the one hand, at the side of the toothed component 2, is secured at a securing location 28, in this instance in the form of a securing opening, and, on the other hand, at the side of the bearing component 3, is guided in a slotted member 38, wherein the securing element 8 is positioned and retained in a defined manner on the bearing component 3 in that it is received in the force introduction region 58 of the deformation element 4 secured to the bearing component 3.

The force introduction region 58 adjoins the deformation element 4 or the deformation component 5 thereof directly at the deformation portion 55 so that crash forces which act on the toothed component 2—depending on the direction of the force—can be introduced via the securing element 8 directly into the deformation portion 55. The deformation portion 55 extends in the embodiment in the longitudinal direction between two lateral regions 50a, 50b of the base member 50 and the force introduction region 58 is also located between those two lateral regions 50a, 50b of the base member 50, directly adjacent to the deformation portion 55.

With reference to FIGS. 2A to 2C and 3A to 3C it can be seen that a through-opening 65 which is constructed as an elongate hole extends in the carrier component 6 in such a manner that it extends along the deformation region 55 and the force introduction region 58 when the deformation component 5 and the carrier component 6 are connected to each other in accordance with provisions, as illustrated in FIGS. 3A and 3B.

According to FIGS. 5A to 5C, on the securing element 8 which is used to secure the toothed component 2 to the bearing component 3 by means of the deformation element 4 and which is constructed in the embodiment as a rivet there is constructed a clamping region 85, in this instance in the form of a shoulder, by means of which the (slightly protruding) deformation portion 55 of the deformation element 4 is pressed against the toothed component 2. Play in the system can thereby be eliminated. The base member 50 of the deformation element 4 is in contrast slightly spaced apart from the toothed component 2 and is therefore not in abutment therewith since at least one head 32a of the securing elements 32 by means of which the deformation element 4 or the base member 50 is secured to the bearing component 3 support the toothed component 2 in such a manner that a small spacing between the toothed component 2 and the base member 50 of the deformation element 4 is maintained.

Furthermore, the slotted member 38 on the bearing component 3, on the one hand, and the deformation portion 55 on the deformation element 4, on the other hand, are constructed in each case and arranged with respect to each other in such a manner that crash forces acting on the toothed component 2—depending on the force direction—are either transmitted directly into the bearing component 3 or first introduced into the deformation portion 55 of the deformation element 4. According to the cross-sectional illustration in FIG. 5C, forces acting on the toothed component 2 with a force direction +z vertically upward result in an introduction of force occurring from the toothed component 2 via the securing element 8 directly into the bearing component 3 since, in that direction +z, the securing element 8 is supported directly on the bearing component 3, that is to say, on the upper edge of the slotted member 38 thereof.

In the opposite direction −z the securing element 8 is in contrast not supported directly on the bearing component 3 since it is spaced apart in that direction from the edge of the slotted member 38. Instead, in the direction −z there is produced a support on the deformation portion 55 of the deformation element 5. If there is therefore an accident as a result of which substantial crash forces act on the toothed component 2 in the said direction −z, this (as a result of the action of the securing element 8 on the deformation portion 55) leads to a deformation and a tearing of the deformation element 4 in the deformation portion 55, in particular at the weak locations in the form of the connection regions 59 (shearing edges). On the one hand, kinetic energy is thereby dissipated or converted into heat and deformation energy; and, on the other hand, there is a selective movement of the toothed component 2 in a downward direction (in the direction −z), wherein the drive subassembly 1 which is in engagement therewith and as a result of this the transverse pipe Q and the seat or upholstery carrier T are carried. A selective positioning of the said subassemblies can thereby be achieved in the event of a crash, by means of which positioning the risk of injury to a vehicle occupant can be reduced.

Based on the arrangement of the adjustment device considered as shown in FIGS. 1A and 1B, in a motor vehicle seat there are produced in the event of a front-end impact (front-end crash) the forces which are designated $F_F$ in FIG. 5A on the toothed component 2, whilst in the event of a rear-end impact (rear-end crash) the forces which are designated $F_H$ act on the toothed component 2. Whilst the first force $F_F$ mentioned according to an overview of FIGS. 5A and 5C are introduced from the toothed component 2 via the securing element 8 directly into the bearing component 3, under the action of the second forces $F_H$ mentioned, there is an introduction of forces from the toothed component 2 via the securing element 8 into the deformation portion 55 of the deformation element 4. This is consequently in particular in the event of a rear-end impact effective for dissipating kinetic energy and for defined lowering of the seat carrier in order to minimize the risk of injury to a seat user, in particular in the throat and neck region.

In the embodiment which is illustrated with reference to FIGS. 1A to 5C, the deformation element 4 is integrated in an adjustment device, by means of which during an adjustment movement the drive subassembly 1 is moved together with the seat subassembly Q, T which is intended to be adjusted, whilst the associated toothed component 2 with which the drive subassembly 1 cooperates is arranged during adjustment operation in a fixed manner (on the bearing component 3). Alternatively, the deformation element 4 may be integrated in an adjustment device which has a drive subassembly which is fixed during adjustment operation and which cooperates with a toothed component 2 which is intended to be moved during adjustment operation.

Furthermore, in the above-described embodiment, the deformation element 4 is integrated in the seat adjustment device and arranged at that location between a bearing component 3 and a toothed component 2 in such a manner that in order to replace the deformation element 4, for example, following an accident in which the deformation element 4 has been deformed, the adjustment device has to be partially disassembled.

In FIGS. 6A and 6B, another embodiment of a deformation element 4 which is intended to be used in a vehicle seat is illustrated. This corresponds with regard to the basic structure to the embodiment described with reference to FIGS. 1A to 5C. Thus, the deformation element 4 in this instance also comprises a base member 50 and a deformation portion 55 which is formed thereon by means of deformation, in particular shearing (punching). The base member 50 and the deformation portion 55 form a deformation component 5 which is connected to a carrier component 6 (for example, by means of laser welding) in a materially engaging manner so that the deformation element 4 is formed by means of the structural unit formed from the deformation component 5 and the carrier component 6. In a state adjacent to the deformation region 55 there is again constructed a force introduction region 58 in the form of an opening in order to be able to introduce forces acting on the seat in the event of a crash into the deformation portion 55. In this instance, the portion is in turn laterally delimited by regions 50a, 50b of the base member 50.

A difference in the construction of the deformation element 4 from FIGS. 6A and 6B compared with the deformation element from FIGS. 1A to 5C involves, according to FIGS. 6A and 6B, the securing locations 151, 161 by means of which the deformation element 4 is intended to be secured to a seat component being arranged on the base member 50 beside the longitudinal sides of the deformation portion 55 and not (as in the case of FIGS. 1A to 5C) in the extent direction of the deformation portion 55 above and below it.

Another difference is that, according to FIGS. 6A and 6B, the deformation element 4 is not integrated in a seat adjustment device which is driven in an electromotive manner, but instead on a structural element in the form of a component L of the seat backrest of a motor vehicle. Each component L is in the embodiment a backrest adapter, by means of which a seat backrest can be coupled to a backrest fitting in order to adjust the backrest inclination. In this instance, the deformation element 4 according to FIGS. 6A and 6B is secured to the seat component L at the securing locations 151, 161 thereof in the form of securing openings by means of securing elements 71. If a backrest frame is secured to each seat component L in the form of a backrest adapter, wherein the force introduction region 58 of the deformation element 4 acts as a securing location, forces acting thereon in the event of a crash can be introduced into the deformation element 4 and in particular into the deformation portion 55 thereof.

The deformation element 4 illustrated in FIGS. 6A and 6B can after a deformation in the event of a crash be changed in a simple manner, that is to say, be replaced with a new deformation element.

The invention claimed is:

1. A deformation element to be arranged on a subassembly of a motor vehicle seat, the deformation element comprising:
   a base member;
   a deformation portion on the base member and which is deformable or destroyable under an external force; and
   a force introduction region configured to establish an operative connection between a structural element of a motor vehicle seat and the deformation portion so that a force acting on said structural element is introduced via the force introduction region into the deformation portion,
   wherein the deformation portion is formed by partial deformation of the material of the deformation element, wherein the deformation portion is integrally connected to the base member along at least one connection line, wherein the deformation element, at the connection line, comprises a thickness less than the thickness of the deformation portion adjacent to the connection line such that at the transition of the deformation portion to the base member a weakening region defining at least one tear line is formed, the deformation element being configured to tear under an external force along the at least one tear line.

2. The deformation element as claimed in claim 1, wherein the deformation portion is formed by partial deformation of the material of the deformation element under pressure.

3. The deformation element as claimed in claim 1, wherein the deformation portion is formed by shearing.

4. The deformation element as claimed in claim 3, wherein the at least one connection line is formed by a shearing edge.

5. The deformation element as claimed in claim 1, wherein the deformation portion is connected outside the force introduction region via a connection region whose thickness is less than the thickness of the deformation portion adjacent to the connection region to form the weakening region with the base member of the deformation element.

6. The deformation element as claimed in claim 1, wherein the base member of the deformation element is planar and is delimited by a peripheral outer edge.

7. The deformation element as claimed in claim 1, wherein the deformation portion protrudes beyond the base member thereof transversely relative to a face along which the deformation element extends.

8. The deformation element as claimed in claim 1, wherein the base member and the deformation portion of the deformation element have substantially the same thickness.

9. A seat subassembly of a motor vehicle seat having a deformation element as claimed in claim 1.

10. The seat subassembly as claimed in claim 9, wherein the deformation element is secured to a structural element of the seat subassembly and wherein another structural element of the seat subassembly is in engagement with the force transmission region of the deformation element.

11. The seat subassembly as claimed in claim 9, wherein the deformation element is integrated in a seat adjustment device.

12. The seat subassembly as claimed in claim 11, wherein a structural element in the form of an adjustment element of the adjustment device is in engagement with the force introduction region of the deformation element so that, when crash forces occur on the adjustment element, a force can be introduced into the deformation portion of the deformation element and, in the event of a deformation and/or destruction of the deformation portion, the adjustment element can be moved along the deformation portion.

13. The seat subassembly as claimed in claim 12, wherein the deformation element is secured to a bearing component of the adjustment device.

14. The seat subassembly as claimed in claim 13, wherein the deformation element is located between the structural element in the form of an adjustment element and the bearing component.

15. A deformation element to be arranged on a subassembly of a motor vehicle seat, the deformation element comprising:

a base member;
a deformation portion which is formed on the base member and which is deformable or destroyable under an external force;
a force introduction region configured to establish an operative connection between a structural element of a motor vehicle seat and the deformation portion so that a force acting on said structural element is introduced via the force introduction region into the deformation portion; and
a carrier component,
wherein the base member of the deformation element is welded to the carrier component and is configured to be fastened together with the carrier component to a subassembly of the motor vehicle seat,
wherein the deformation element and the carrier element are placed on top of each other and extend along parallel planes.

16. The deformation element as claimed in claim 15, wherein the carrier component is planar and is delimited by a peripheral outer edge.

17. The deformation element as claimed in claim 16, wherein the base member and the carrier component are connected to each other at the respective outer edge thereof in a materially engaging manner.

18. The deformation element as claimed in claim 15, wherein an opening in the carrier component extends along the deformation portion of the deformation element.

* * * * *